US010876577B2

(12) United States Patent
Van Der Hoek et al.

(10) Patent No.: US 10,876,577 B2
(45) Date of Patent: Dec. 29, 2020

(54) HOISTING CRANE, SLEW BEARING, SLEW BEARING ASSEMBLY METHOD, SLEW BEARING MAINTENANCE METHOD AND VESSEL (71) Applicant: ITREC B.V., Schiedam (NL)

(72) Inventors: Teunis Van Der Hoek, Schiedam (NL); Joop Roodenburg, Schiedam (NL); Johannes René Eshuis, Schiedam (NL)

(73) Assignee: ITREC B.V., Schiedam (NL)

( * ) Notice: Subject to any disclaimer, the term of this patent is extended or adjusted under 35 U.S.C. 154(b) by 102 days.

(21) Appl. No.: 16/093,456

(22) PCT Filed: Apr. 13, 2017

(86) PCT No.: PCT/NL2017/050234
§ 371 (c)(1),
(2) Date: Oct. 12, 2018

(87) PCT Pub. No.: WO2017/179983
PCT Pub. Date: Oct. 19, 2017

(65) Prior Publication Data
US 2020/0158176 A1 May 21, 2020

(30) Foreign Application Priority Data
Apr. 15, 2016 (NL) .................................... 2016616

(51) Int. Cl.
F16C 33/60 (2006.01)
B63B 27/10 (2006.01)
(Continued)

(52) U.S. Cl.
CPC .............. *F16C 33/60* (2013.01); *B63B 27/10* (2013.01); *B66C 23/52* (2013.01); *B66C 23/84* (2013.01);
(Continued)

(58) Field of Classification Search
CPC ....... B66C 23/02; B66C 23/16; B66C 23/525; B66C 23/84; F16C 1/02; F16C 11/04;
(Continued)

(56) References Cited

U.S. PATENT DOCUMENTS 4,096,952 A * 6/1978 Diggs .................... B66C 23/201
212/176
5,328,040 A * 7/1994 Morrow .................. B66C 23/52
212/253
(Continued)

FOREIGN PATENT DOCUMENTS

DE 1 271 469 6/1968
DE 1 303 659 6/1972
(Continued)

OTHER PUBLICATIONS

Dutch Search Report, issued in Priority Application No. 2016616, dated Dec. 20, 2016.
(Continued)

Primary Examiner — Emmanuel M Marcelo
(74) Attorney, Agent, or Firm — Birch Stewart Kolasch & Birch LLP (57) ABSTRACT A slew bearing including a stationary bearing ring to be fixed to a base, and a moveable bearing ring which is to be fixed to a moveable object and which is concentric with the stationary bearing ring, the stationary bearing ring and moveable bearing ring being configured to enable rotation of the moveable bearing ring relative to the stationary bearing ring, wherein the moveable bearing ring comprises a top ring member, a bottom ring member, and a middle ring member in between the top and bottom ring member, the top, middle and bottom ring members each being formed by a plurality of ring segments wherein vertical joints between ring segments of adjacent ring members are not aligned to each other, wherein the top, middle and bottom ring member
(Continued)

comprise a plurality of holes distributed about the circumference of the moveable ring, respectively, wherein the top, middle and bottom ring member are connected to each other by a plurality of bolts received in the corresponding holes of the moveable ring member, and wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member, respectively.

15 Claims, 5 Drawing Sheets

(51) Int. Cl.
 *B66C 23/52* (2006.01)
 *B66C 23/84* (2006.01)
(52) U.S. Cl.
 CPC ........ *B66C 23/525* (2013.01); *F16C 2226/14* (2013.01); *F16C 2300/14* (2013.01); *F16C 2326/30* (2013.01)
(58) Field of Classification Search
 CPC .......... F16C 17/08; F16C 19/12; F16C 19/30; F16C 19/507; F16C 19/543; F16C 19/55; F16C 33/58
 See application file for complete search history.

(56) References Cited

U.S. PATENT DOCUMENTS

| | | | |
|---|---|---|---|
| 2006/0230690 A1* | 10/2006 | Dunick | E04B 1/3465 52/64 |
| 2008/0179482 A1* | 7/2008 | van Amelsfoort | F16L 39/04 248/349.1 |
| 2011/0031755 A1* | 2/2011 | Numajiri | F03D 7/0204 290/55 |
| 2018/0171716 A1* | 6/2018 | Williams | E21B 3/04 |
| 2019/0322479 A1* | 10/2019 | Thoresen | B65H 49/34 |

FOREIGN PATENT DOCUMENTS

| | | |
|---|---|---|
| GB | 1179174 | 1/1970 |
| WO | WO 2015/088332 A1 | 6/2015 |
| WO | 2017-179986 A1 * | 10/2017 ............. B66C 23/84 |

OTHER PUBLICATIONS

International Search Report, issued in PCT/NL2017/050234, dated Jul. 3, 2017.
Written Opinion of the International Searching Authority, issued in PCT/NL2017/050234, dated Jul. 3, 2017.

* cited by examiner

HOISTING CRANE, SLEW BEARING, SLEW BEARING ASSEMBLY METHOD, SLEW BEARING MAINTENANCE METHOD AND VESSEL

The invention relates to a slew bearing, a hoisting crane, a slew bearing assembly method, a slew bearing maintenance method and a vessel.

Hoisting cranes are large type cranes that are for example used in the off shore industry. The cranes have a crane structure comprising a crane housing and a jib, which jib is often configured to be pivoted about a substantially horizontal axis. Furthermore, to correctly position the crane and to enable the cranes to transport a load from one place to another, these cranes are provided with a slew bearing. The slew bearing is provided between the crane housing and a base supporting the crane structure, and thus transmits weight loads, tilting loads and radial loads between the crane structure and the base. The slew bearing has a rotational axis that extends in an substantially vertical direction to enable the crane structure, and thus the jib, to be rotated relative to the base about the rotational axis.

The slew bearing usually comprises a stationary bearing ring fixed to the base and a moveable ring fixed to the crane housing and concentric with the stationary bearing ring. In order to allow an easy assembly of the slew bearing, the moveable bearing ring comprises multiple ring members which have to be connected together to form the moveable bearing ring.

With the current development of further increasing the dimensions of the cranes in order to be able to hoist heavier loads, the technical demands for the slew bearing also increase. A particular issue that needs attention is that the slew bearing needs to keep its essentially circular shape despite the loads applied to it. A solution would be to manufacture the rings or ring members of the slew bearing out of one piece, but this is not feasible with increasing dimensions of the slew bearing, which can easily be up to tens of meters, so that the rings or ring members are formed by a plurality of ring segments.

The same problems may occur with slew bearings used in other applications such as slew bearings provided in between the hull of a vessel and a turret extending through the hull.

Hence, it is an object of the invention to connect all ring segments of the ring members of a slew bearing together to form a rigid moveable bearing ring.

This object is achieved by a slew bearing comprising a stationary bearing ring to be fixed to a base, and a moveable bearing ring which is to be fixed to a moveable object and which is concentric with the stationary bearing ring, the stationary bearing ring and moveable bearing ring being configured to enable rotation of the moveable bearing ring relative to the stationary bearing ring,
wherein the moveable bearing ring comprises a top ring member, a bottom ring member, and a middle ring member in between the top ring member and the bottom ring member, the top, middle and bottom ring members each being formed by a plurality of ring segments,
wherein vertical joints between ring segments of adjacent ring members are not aligned to each other,
wherein the top ring member, middle ring member and bottom ring member comprise a plurality of holes distributed about the circumference of the moveable ring, respectively,
wherein the top ring member, middle ring member and bottom ring member are connected to each other by a plurality of bolts received in the corresponding holes of the moveable ring member,
wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member, respectively.

An advantage of the slew bearing according to the invention is that a rigid moveable bearing ring is obtained by combining the effects of three main features of the slew bearing, namely:

1) The non-alignment of the vertical joints of adjacent ring members, so that each ring segment of a ring member overlaps with two ring segments of an adjacent ring member;
2) Providing alignment members to align adjacent ring members with respect to each other and provide an obstruction for mutual movement of the ring members; and
3) Clamping together the ring members using the bolts, where the alignment members are hollow so that a bolt can also be used at the location of the alignment member, thereby providing an evenly distributed clamping of the ring members.

In a preferred embodiment, a tubular alignment member is provided at or near a vertical joint between ring segments, preferably a tubular alignment member is provided at or near each vertical joint between ring segments.

The expression "at a vertical joint" means that the tubular alignment member is arranged next to the vertical joint and no other bolts are in between the tubular alignment member and the vertical joint. The expression near a vertical joint means that one or more bolts may be provided in between the tubular alignment member and the vertical joint. Preferably, only one or two bolts are present in between the tubular alignment member and the vertical joint.

In an embodiment, the vertical joints between ring segments of the top ring member are aligned with the vertical joints between ring segments of the bottom ring member. As a result thereof, the vertical joints in the top ring member and the vertical joints in the bottom ring member can share the same tubular alignment members without compromising the structural integrity of the slew bearing. In that case it is preferred that at each aligned couple of vertical joints in the top and bottom ring members, the respective tubular alignment members extend from the top ring member via the middle ring member to the bottom ring member.

In an embodiment, at each vertical joint between ring segments of the middle ring member, the respective tubular alignment members extend from the middle ring member to the top ring member. This may allow introduction of and access to the tubular alignment member from above via the top ring member.

In an embodiment, a tubular alignment member is provided on either side of each vertical joint between ring segments thereby forming a rigid structure on either side of the vertical joints and further reducing the risk of deformation or movement of ring segments.

In an embodiment, the tubular alignment member comprises an inner thread allowing a tool to be coupled to the tubular alignment member for removal of the tubular alignment member. This is beneficial in situations where the tubular alignment member is not easily removed from the respective holes. The tool then allows to easily engage with the tubular alignment member and apply for instance pulling forces for removal or replacement of the tubular alignment member.

In an embodiment, the respective bolt extending through the tubular alignment member and at least one corresponding nut apply clamping forces to the ring members without applying significant clamping forces to the tubular alignment member. As a result thereof, the tubular alignment member has minimal influence on the manner the moveable ring member is clamped together by the bolts providing the most rigid construction. In other words, the tubular alignment member only aligns ring members in plane of the slew bearing and not in a direction perpendicular thereto.

The invention also relates to a hoisting crane comprising:
a crane structure with a crane housing;
a base; and
a slew bearing arranged between the crane housing and the base to allow rotation of
the crane housing relative to the base about a substantially vertical rotation axis, wherein the slew bearing comprises a stationary bearing ring fixed to the base, and a moveable bearing ring which is fixed to the crane housing and which is concentric with the stationary bearing ring, the stationary bearing ring and moveable bearing ring being configured to enable rotation of the moveable bearing ring relative to the stationary bearing ring,
wherein the moveable bearing ring comprises a top ring member, a bottom ring member, and a middle ring member in between the top ring member and the bottom ring member, the top, middle and bottom ring members each being formed by a plurality of ring segments, wherein vertical joints between ring segments of adjacent ring members are not aligned to each other,
wherein the top ring member, middle ring member and bottom ring member comprise a plurality of holes distributed about the circumference of the moveable ring, respectively,
wherein the top ring member, middle ring member and bottom ring member are connected to each other by a plurality of bolts received in the corresponding holes of the moveable ring member,
wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member, respectively.

In an embodiment, the crane housing comprises a flange at a bottom side thereof, which flange is adjacent to the top ring member, and wherein the plurality of bolts extend through the top ring member, the middle ring member, the bottom ring member and the flange to connect the crane housing to the moveable bearing ring while at the same time connecting the top ring member, the middle ring member and the bottom ring member together.

Features described in relation to the slew bearing according to the invention may also apply, where applicable, to the slew bearing of the hoisting crane according to the invention.

The invention further relates to a method for assembling a slew bearing according to the invention, comprising the following steps:

a) arranging ring segments of the middle ring member and the top ring member and/or the bottom ring member in a desired configuration;
b) temporarily shrinking a size of the tubular alignment member by lowering its temperature;
c) inserting the shrunken tubular alignment member in the corresponding holes of the respective ring segments; and
d) connecting the top ring member, the middle ring member and the bottom ring member together using the plurality of bolts.

Features described in relation to the slew bearing according to the invention may also apply, where applicable, to the method for assembling the slew bearing according to the invention.

The invention also relates to a method for performing maintenance on a slew bearing according to the invention, wherein the tubular alignment member comprises an inner thread allowing a tool to be coupled to the tubular alignment member for removal of the tubular alignment member, said method comprising the following steps:

a) coupling the tool to a tubular alignment member; and
b) removing the tubular alignment member by applying loads to the tool.

In an embodiment, the bolt extending through the tubular alignment member is removed prior to coupling the tool to the tubular alignment member.

Features described in relation to the slew bearing according to the invention may also apply, where applicable, to the method for performing maintenance on a slew bearing according to the invention.

The invention further relates to a vessel comprising:
a hull provided with an opening extending vertically through the hull;
a turret extending in the opening of the hull; and
a slew bearing arranged between the hull and the turret allowing the turret to rotate relative to the hull about a vertical rotation axis,
wherein the slew bearing comprises a stationary bearing ring fixed to the hull, and a moveable bearing ring which is fixed to the turret and which is concentric with the stationary bearing ring, the stationary bearing ring and moveable bearing ring being configured to enable rotation of the moveable bearing ring relative to the stationary bearing ring,
wherein the moveable bearing ring comprises a top ring member, a bottom ring member, and a middle ring member in between the top ring member and the bottom ring member, the top, middle and bottom ring members each being formed by a plurality of ring segments,
wherein vertical joints between ring segments of adjacent ring members are not aligned to each other,
wherein the top ring member, middle ring member and bottom ring member comprise a plurality of holes distributed about the circumference of the moveable ring, respectively,
wherein the top ring member, middle ring member and bottom ring member are connected to each other by a plurality of bolts received in the corresponding holes of the moveable ring member,
wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member, respectively.

In an embodiment, the vessel is a floating production, storage and offloading vessel.

Features described in relation to the slew bearing according to the invention may also apply, where applicable, to the slew bearing of the vessel according to the invention.

The invention will now be described in a non-limiting way by reference to the accompanying drawings in which like parts are indicated by like reference symbols and in which.

Figure 1:
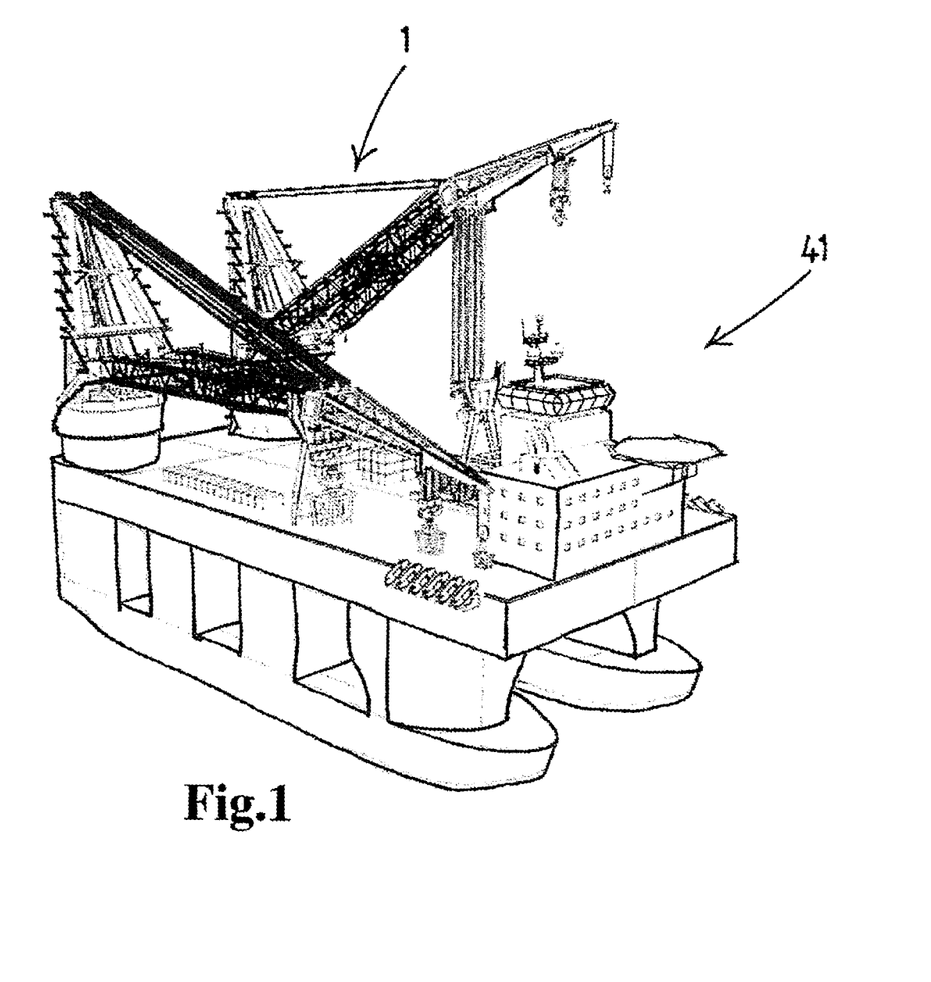
FIG. 1 depicts a perspective view of a vessel provided with two hoisting cranes according to the invention.
Figure 2:
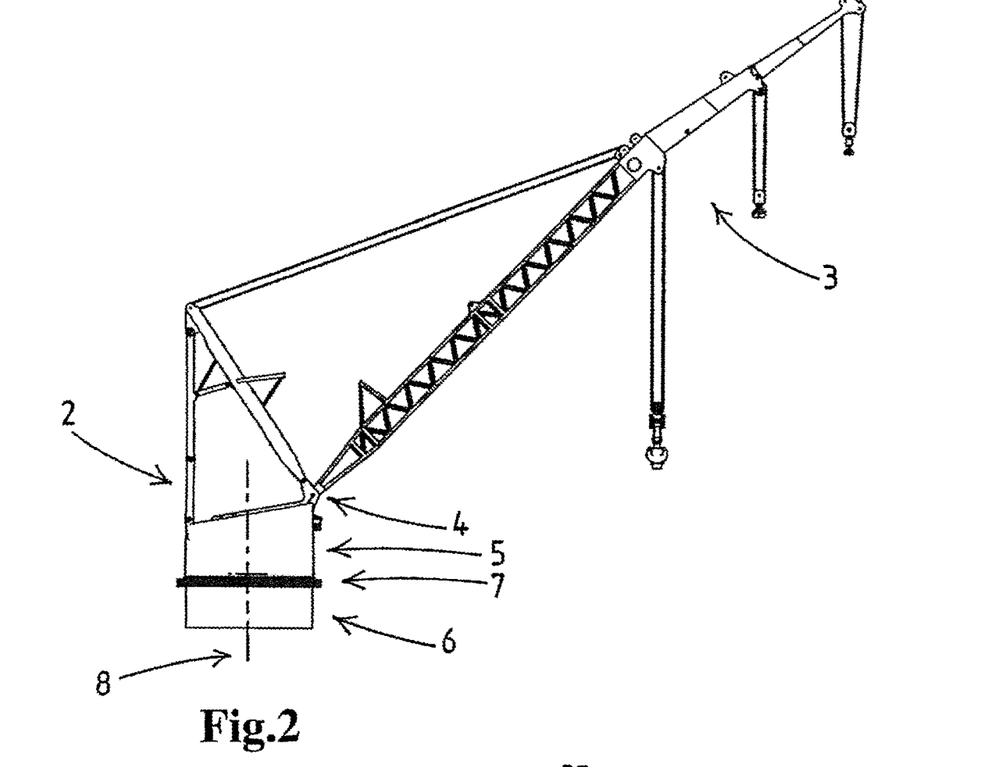
FIG. 2 depicts a side view of a hoisting crane of FIG. 1.

FIG. 1 shows a perspective view of a vessel 41 provided with two hoisting cranes 1 according to the invention. FIG. 2 shows a side view of one of the two hoisting cranes shown in FIG. 1. The hoisting crane 1 comprises a crane structure 2, which crane structure 2 comprises a jib 3. In the embodiment shown, the jib 3 can be pivoted about a substantially horizontal pivot axis 4.

The crane structure 2 further comprises a crane housing 5. To support the crane structure 2 including crane housing 5, a base 6 is provided, which base 6 is secured to the vessel 41. To enable rotation of the crane structure 2 about a vertical axis, the hoisting crane 1 is provided with a slew bearing 7. The slew bearing 7 has a rotational axis 8 that extends in a substantially vertical direction and allows the crane housing 5, and thus the crane structure 2 comprising the jib 3, to be rotated relative to the base 6 about said rotational axis 8.

Figure 3:
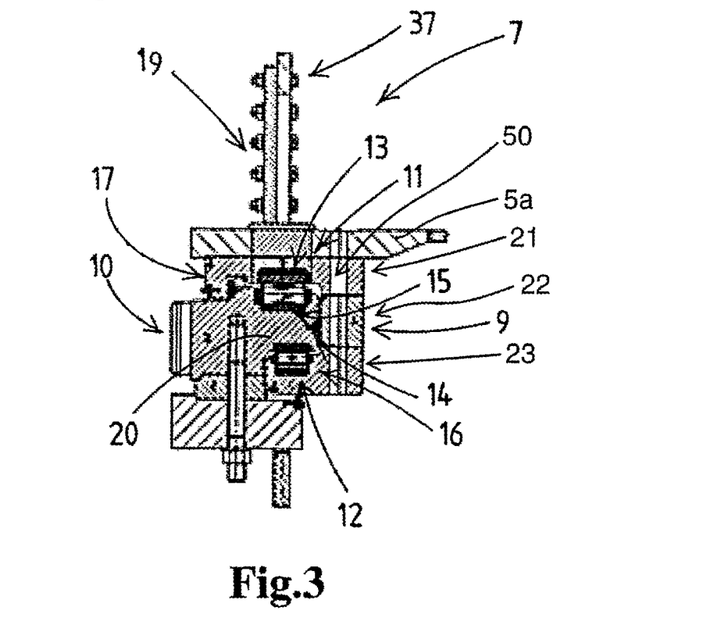
FIG. 3 depicts a cross sectional view of a slew bearing of a hoisting crane according to the invention.

FIG. 3 shows a cross sectional view of the slew bearing 7 of the hoisting crane 2. The slew bearing 7 is provided between the base 6 and the crane housing 5, and comprises a moveable bearing ring 9 which is secured to the crane housing 5 and a stationary bearing ring 10, concentric with the moveable bearing ring 9, which is secured to the base 6. Weight loads, tilting loads and radial loads are transmitted, i.e. transferred between crane structure 2 and vessel 41, more in particular between crane housing 5 and base 6, via the slew bearing 7.

To enable rotation of the moveable bearing ring 9 relative to the stationary bearing ring 10, a first row of axial load rollers 11 and a second row of axial load rollers 12 are provided between the moveable bearing 9 ring and the stationary bearing ring 10. The rows of axial load rollers are each provided between a top roller raceway 13,14 and corresponding bottom roller raceway 15,16, which top and bottom roller raceways are each connected to one of the bearing rings.

In the particular embodiment shown, the moveable bearing ring 9 has a C-shaped cross section, comprising a top ring member 21, a middle ring member 22 and a bottom ring member 23, and the stationary bearing ring 10 comprises a flange section 20 which extends in the radial direction, here, in the embodiment shown, the radially outward direction.

The moveable bearing ring 9 engages the flange section 20 of the stationary bearing ring 10 such that its top ring member 21 extends above the flange section 20 of the stationary bearing ring 10 and the bottom ring member 23 extends below the flange section 20 of the stationary bearing ring 10.

The first row of axial load rollers 11 is provided between the top ring member 21 of the moveable bearing ring 9 and the flange section 20 of the stationary bearing ring 10, with the top roller raceway 13 and the bottom roller raceway 15 attached to the moveable bearing ring 9 and the stationary bearing ring 10, respectively.

The second row of axial load rollers 12 is provided between the bottom ring member 23 of the moveable bearing ring 9 and the flange section 20 of the stationary bearing ring 10, with the top roller raceway 14 and bottom roller raceway 16 attached to the stationary bearing ring 10 and the moveable bearing ring 9, respectively.

Figure 4:
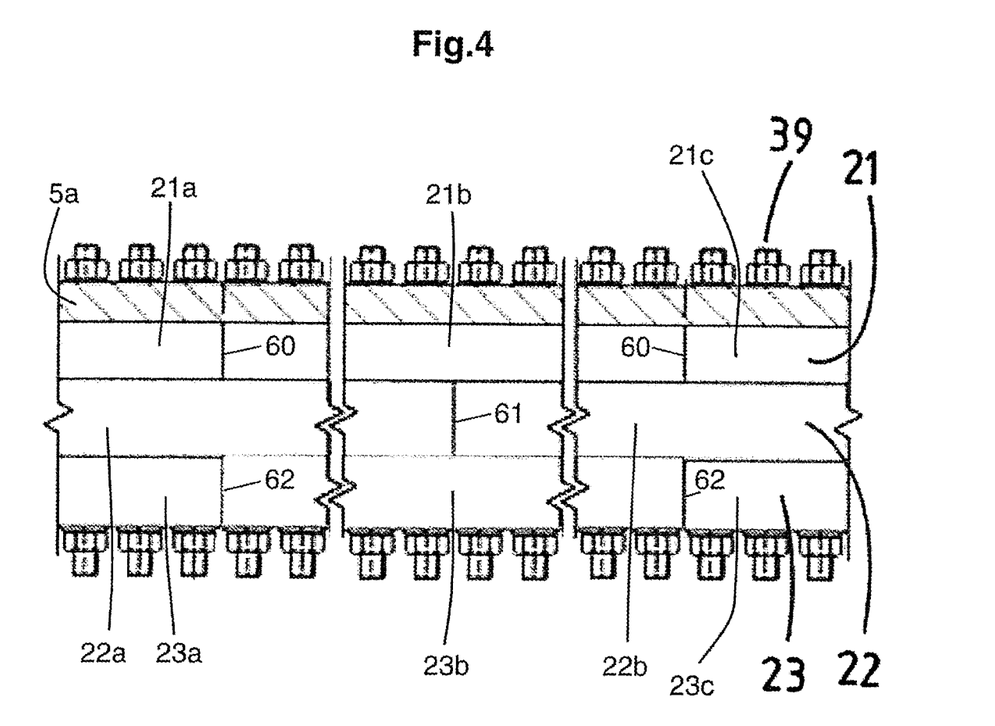
FIG. 4 depicts a partial side view of the moveable bearing ring of the slew bearing shown in FIGS. 1-3.

FIG. 4 shows a partial side view of the moveable bearing ring 9 of the slew bearing 7 of FIGS. 1-3 connected to the crane housing 5 of which a flange 5a is shown in FIGS. 3 and 4. It can be clearly seen in FIG. 4 that the top ring member 21 of the moveable bearing 9 comprises multiple semi-circular top ring segments 21a, 21b, 21c, that the middle ring member 22 of the moveable bearing 9 comprises multiple semi-circular middle ring segments 22a, 22b, and that the bottom ring member 23 of the moveable bearing 9 comprises multiple semi-circular bottom ring segments 23a, 23b, 23c.

Each of the aforementioned ring segments extends along a part of a circumference of the moveable bearing ring 9. The semi-circular ring segments are held together by way of multiple bolts 39 which extend through openings provided in the semi-circular segments. One such opening is indicated in FIG. 3 by reference numeral 50. The bolts 39 and respective openings are distributed, preferably evenly distributed, along the circumference of the moveable ring member 9.

As can be clearly seen in FIG. 4, the vertical joints between ring segments of adjacent ring members are not aligned to each other, so that the ring segments overlap with at least two adjacent ring segments. This has the advantage that a more rigid ring can be obtained. In this specific embodiment, the vertical joints 60 in the top ring member 21 are not aligned with the vertical joints 61 in the adjacent middle ring member 22, and in turn the vertical joints 61 in the middle ring member 22 are not aligned with the vertical joints 62 in the adjacent bottom ring member 23. However, vertical joints 60 and 62 of the non-adjacent top and bottom ring members 21, 23 are aligned in this embodiment.

Figure 5:
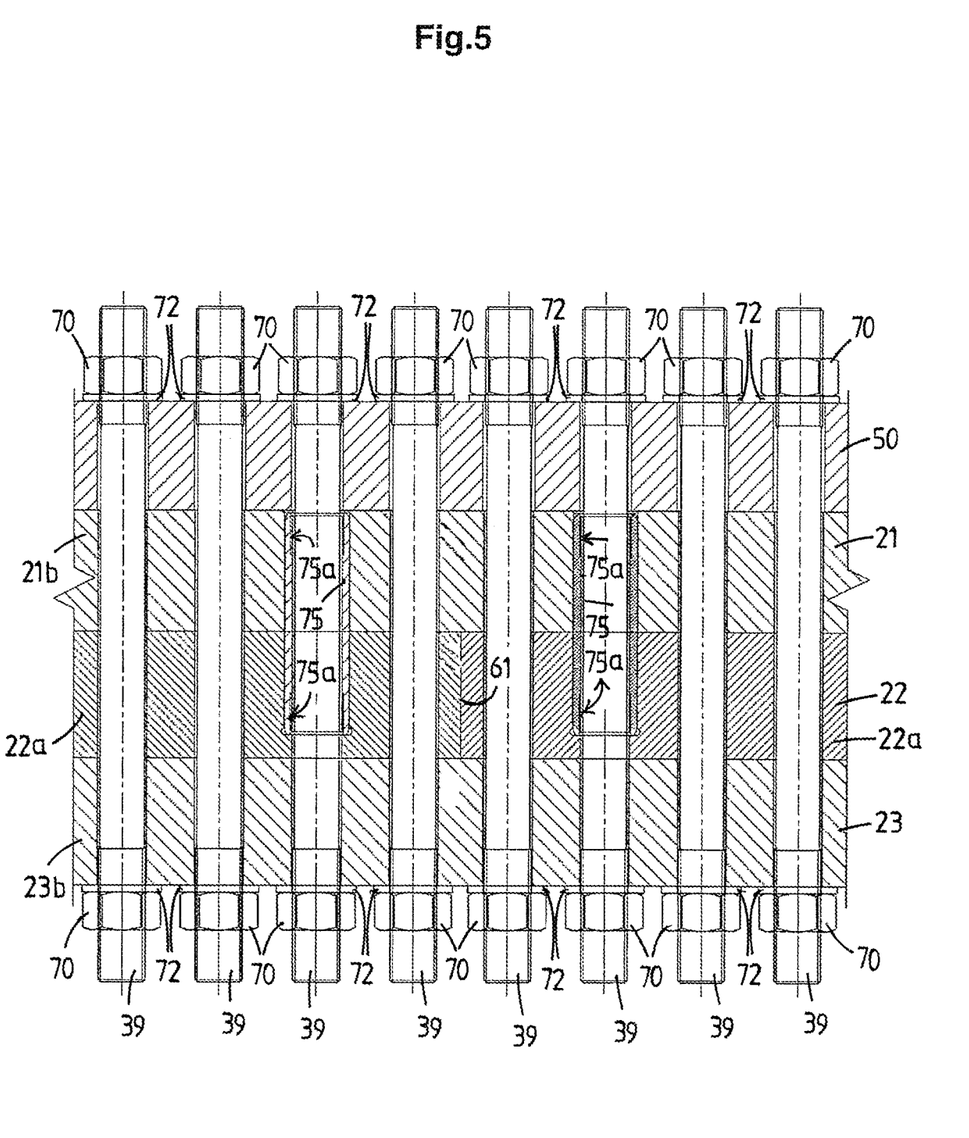
FIG. 5 depicts a cross sectional view of the moveable bearing ring of FIG. 4 at a vertical joint between ring segments in the middle ring member of the moveable bearing ring.

FIG. 5 depicts a cross sectional view of the moveable bearing ring of FIG. 4 at a location of a vertical joint 61 between ring segments 22a, 22b in the middle ring member 22 of the moveable bearing ring.

Shown in FIG. 5 are the flange 5a, the top ring member 21, the middle ring member 22 and the bottom ring member 23 that are connected to each other by a plurality of bolts 39 received in corresponding holes 50 in the moveable bearing ring and the flange 5a. In this embodiment, both ends of the bolts 39 are provided with a thread to mate with a corresponding nut 70 and which nuts 70 can be tightened to provide the clamping action. To distribute the clamping force to the flange 5a and the moveable bearing ring, rings 72 are provided between the nuts 70 and the flange 5a or bottom ring member 23, respectively.

Due to fabrication tolerances, there may be play between the bolts 39 and the respective ring segments allowing the ring segments to move relative to each other. Due to the loads applied to the moveable ring member, the clamping action of the bolts may not be sufficient to prevent such movements resulting in undesired deformation of the moveable ring member. This may lead to increased wear and possibly damage to the slew bearing.

The moveable bearing ring is therefore provided with two tubular alignment members 75 provided on either side of the vertical joint 61 at or near the vertical joint 61. The alignment members 75 are provided in holes in the top ring member 21 and middle ring member 22, where the holes in these members 21 and 22 have a larger diameter than the other holes which are not provided with tubular alignment members, which larger diameter is equal to the outer diameter of the tubular alignment members 75. The inner diameter of the tubular alignment members 75 allows to receive the corresponding bolt 39 and in this embodiment equals the inner diameter of the other holes which are not provided with tubular alignment members 75.

The length of the tubular alignment members 75 is large enough to extend from the middle ring member 22 to the top ring member 21, which in combination with the diameter of the holes in the middle and top ring members being equal to the outer diameter of the tubular alignment members result in an tight alignment between the middle ring member 22 and the top ring member 21. The length of the tubular alignment members 75 is preferably smaller than the corresponding length of the respective holes, so that clamping forces applied to the moveable bearing ring by the bolts and nuts do not result in significant clamping forces applied to the tubular alignment members. Hence, the tubular alignment members 75 substantially only align in plane of the slew bearing.

The diameter of the holes in the middle and top ring members being equal to the outer diameter of the tubular alignment members should be evaluated when the tubular alignment members are provided in the respective holes. Hence, it is possible that comparing the outer diameter of the tubular alignment members and the diameter of the holes prior to introducing the tubular alignment members into the holes results in the outer diameter being larger than the diameter of the holes. By shrinking the tubular alignment member, e.g. by lowering its temperature, it can be fitted into the hole. After regaining room temperature, the tubular alignment member will engage with the wall of the holes and some deformation of the tubular alignment member and/or hole may occur.

Especially when engagement between tubular alignment member and corresponding hole includes deformation of either one of the components, the tubular alignment member may not be easily removed from the corresponding hole, e.g. during maintenance or repair. To facilitate removal of the tubular alignment member, the tubular alignment members 75 may be provided with an inner thread 75a at one or in this case both ends of the tubular alignment members. It is then possible to connect a tool with a corresponding mating outer thread to the tubular alignment member and apply pulling forces to the tubular alignment member.

Figure 6:
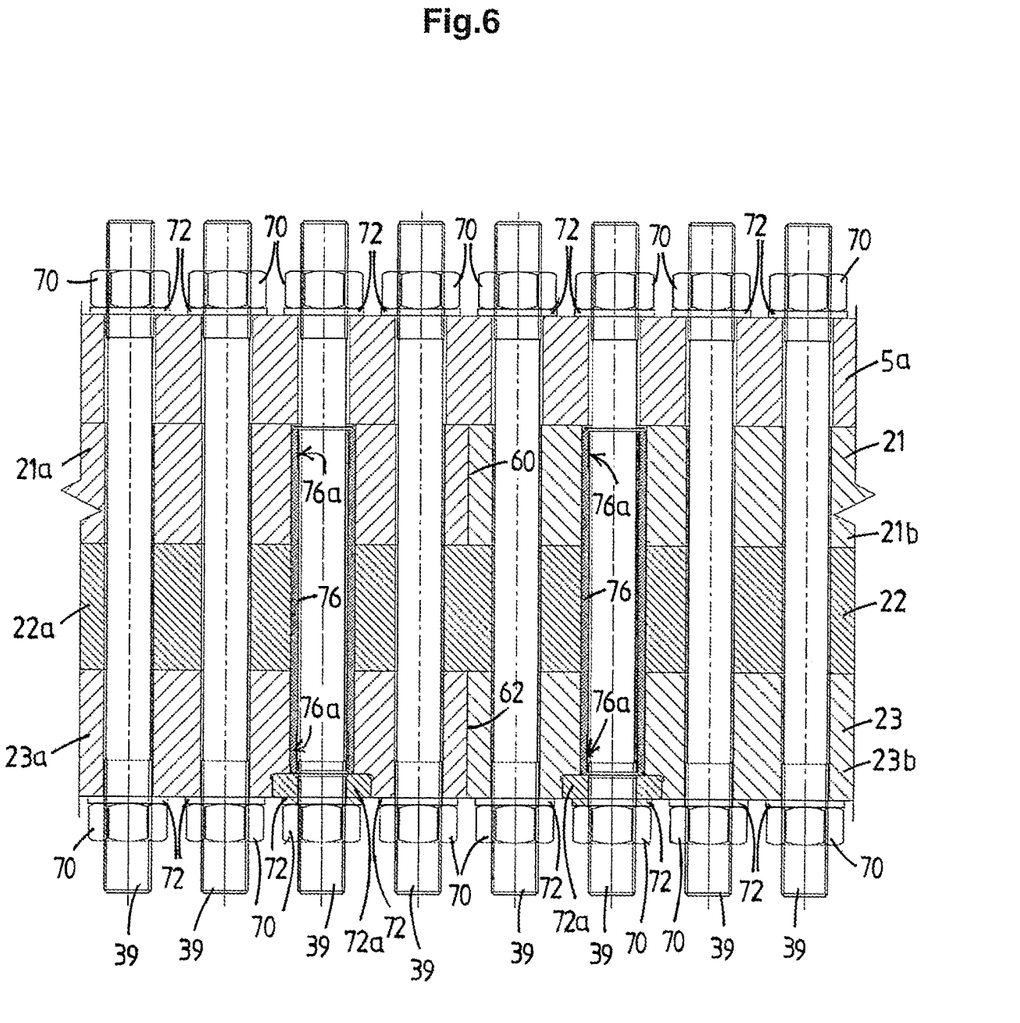
FIG. 6 depicts a cross sectional view of the moveable bearing ring of FIG. 4 at vertical joints between ring segments in the top and bottom ring members of the moveable bearing ring.

FIG. 6 depicts a cross sectional view of the moveable bearing ring of FIG. 4 at a location of vertical joint 60 between ring segments 21a, 21b in the top ring member 21 of the moveable bearing ring and at a location of vertical joint 62 between ring segments 23a, 23b in the bottom ring member 23 of the moveable bearing ring.

Shown in FIG. 6 are the flange 5a, the top ring member 21, the middle ring member 22 and the bottom ring member 23 that are connected to each other by a plurality of bolts 39 received in corresponding holes 50 in the moveable bearing ring and the flange 5a. As already shown in FIG. 5, both ends of the bolts 39 are provided with a thread to mate with a corresponding nut 70, which nuts 70 can be tightened to provide a clamping action to the moveable bearing ring and the flange 5a. To distribute the clamping force to the flange 5a and the moveable bearing ring, rings 72, 72a are provided between the nuts 70 and the flange 5a or bottom ring member 23, respectively.

Due to fabrication tolerances, there may be play between the bolts 39 and the respective ring segments allowing the ring segments to move relative to each other. Due to the loads applied to the moveable ring member, the clamping action of the bolts may not be sufficient to prevent such movements resulting in undesired deformation of the moveable ring member. This may lead to increased wear and possibly damage to the slew bearing.

The moveable bearing ring is therefore provided with two tubular alignment members 76 provided on either side of the vertical joints 60, 62 at or near the vertical joints 60, 62. The alignment members 76 are provided in holes in the top, middle and bottom ring members 21, 22, 23, which holes have a larger diameter than the other holes which are not provided with tubular alignment members, which larger diameter is equal to the outer diameter of the tubular alignment members 76. The inner diameter of the tubular alignment members 76 allows to receive the corresponding bolt 39 and in this embodiment equals the inner diameter of the other holes which are not provided with tubular alignment members 76.

The length of the tubular alignment members 76 is large enough to extend from the bottom ring member 23 to the top ring member 21, which in combination with the diameter of the holes in the bottom and top ring members being equal to the outer diameter of the tubular alignment members result in a tight alignment between the bottom ring member 23 and the top ring member 21. The length of the tubular alignment members 76 is preferably smaller than the corresponding length of the respective holes, so that clamping forces applied to the moveable bearing ring by the bolts and nuts do not result in significant clamping forces applied to the tubular alignment members. Hence, the tubular alignment members 76 substantially only align in plane of the slew bearing.

The holes receiving the tubular alignment members 76 are in this embodiment through holes meaning that the larger diameter applies to the entire length of the hole through the moveable bearing ring. When the larger diameter of the hole is near, i.e. gets close to the diameter of the rings 72, the function of the rings 72 may be lost for the bolts running through the tubular alignment members 76. To solve this, a solution may be to enlarge the respective holes at a bottom surface of the bottom ring member 23 and provide an intermediate member 72a that allows to apply the clamping loads from the rings 72 to the bottom ring member 23 instead of the tubular alignment member 76. The ring 72 and the intermediate member 72a may also be integrated to form a single component providing the same function as the other rings 72.

The diameter of the holes in the middle and top ring members being equal to the outer diameter of the tubular alignment members should be evaluated when the tubular alignment members are provided in the respective holes. Hence, it is possible that comparing the outer diameter of the tubular alignment members and the diameter of the holes prior to introducing the tubular alignment members into the holes results in the outer diameter being larger than the diameter of the holes. By shrinking the tubular alignment member, e.g. by lowering its temperature, it can be fitted into the hole. After regaining room temperature, the tubular alignment member will engage with the wall of the holes and some deformation of the tubular alignment member and/or hole may occur.

Especially when engagement between tubular alignment member and corresponding hole includes deformation of either one of the components, the tubular alignment member may not be easily removed from the corresponding hole, e.g. during maintenance or repair. To facilitate removal of the tubular alignment member, the tubular alignment members 76 may be provided with an inner thread 76a at one or in this case both ends of the tubular alignment members. It is then possible to connect a tool with a corresponding mating outer thread to the tubular alignment member and apply pulling forces to the tubular alignment member.

Although a slew bearing has been described by reference to the drawings in relationship to a hoisting crane, it will be apparent to the skilled person that the slew bearing according to the invention can also be used in other applications including a vessel comprising a large rotatable structure such as a turret, which rotatable structure is rotatable relative to the hull of the vessel about a substantially vertical axis.

The invention claimed is:

1. A slew bearing comprising a stationary bearing ring to be fixed to a base, and a moveable bearing ring which is to be fixed to a moveable object and which is concentric with the stationary bearing ring, the stationary bearing ring and moveable bearing ring being configured to enable rotation of the moveable bearing ring relative to the stationary bearing ring,
   wherein the moveable bearing ring comprises a top ring member, a bottom ring member, and a middle ring member in between the top ring member and the bottom ring member, the top, middle and bottom ring members each being formed by a plurality of ring segments,
   wherein vertical joints between ring segments of adjacent ring members are not aligned to each other,
   wherein the top ring member, middle ring member and bottom ring member comprise a plurality of holes distributed about the circumference of the moveable ring, respectively,
   wherein the top ring member, middle ring member and bottom ring member are connected to each other by a plurality of bolts received in the corresponding holes of the moveable ring member, and
   wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member, respectively.

2. The slew bearing according to claim 1, further comprising a plurality of said tubular alignment member, wherein each vertical joint between ring segments is provided with one of said plurality of tubular alignment members at or near said each vertical joint between ring segments.

3. The slew bearing according to claim 1, wherein the vertical joints between ring segments of the top ring member are aligned with the vertical joints between ring segments of the bottom ring member.

4. The slew bearing according to claim 3, wherein at each aligned couple of vertical joints in the top and bottom ring members, the respective tubular alignment members extend from the top ring member via the middle ring member to the bottom ring member.

5. The slew bearing according to claim 3, wherein at each vertical joint between ring segments of the middle ring member, the respective tubular alignment members extend from the middle ring member to the top ring member.

6. The slew bearing according to claim 1, further comprising a plurality of said tubular alignment member, wherein each vertical joint between ring segments is provided with one of said plurality of tubular alignment members on either side of said each vertical joint between ring segments.

7. The slew bearing according to claim 1, wherein the tubular alignment member comprises an inner thread allowing a tool to be coupled to the tubular alignment member for removal of the tubular alignment member.

8. A method for performing maintenance on the slew bearing according to claim 7, comprising the following steps:
   coupling the tool to the tubular alignment member; and
   removing the tubular alignment member by applying loads to the tool.

9. The method according to claim 8, wherein prior to coupling the tool to the tubular alignment member, the bolt extending through the tubular alignment member is removed.

10. The slew bearing according to claim 1, wherein the respective bolt extending through the tubular alignment member and at least one corresponding nut apply clamping forces to the ring members without applying significant clamping forces to the tubular alignment member.

11. A method for assembling the slew bearing according to claim 1, comprising the following steps:
   arranging ring segments of the middle ring member and the top ring member and/or the bottom ring member in a desired configuration;
   temporarily shrinking a size of the tubular alignment member by lowering its temperature;
   inserting the shrunken tubular alignment member in the corresponding holes of the respective ring segments; and
   connecting the top ring member, the middle ring member and the bottom ring member together using the plurality of bolts.

12. A hoisting crane comprising:
   a crane structure with a crane housing;
   a base; and
   a slew bearing arranged between the crane housing and the base to allow rotation of the crane housing relative to the base about a substantially vertical rotation axis,
   wherein the slew bearing comprises a stationary bearing ring fixed to the base, and a moveable bearing ring which is fixed to the crane housing and which is concentric with the stationary bearing ring, the stationary bearing ring and moveable bearing ring being configured to enable rotation of the moveable bearing ring relative to the stationary bearing ring,
   wherein the moveable bearing ring comprises a top ring member, a bottom ring member, and a middle ring member in between the top ring member and the bottom ring member, the top, middle and bottom ring members each being formed by a plurality of ring segments, wherein vertical joints in the top, middle and bottom ring member between adjacent ring segments are not aligned to each other, wherein the top ring member, middle ring member and bottom ring member comprise a plurality of holes distributed about the circumference of the moveable ring, respectively, wherein the top ring member, middle ring member and bottom ring member are connected to each other by a plurality of bolts received in the corresponding holes of the moveable ring member, and wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member respectively.

13. The hoisting crane according to claim 12, wherein the crane housing comprises a flange at a bottom side thereof, which flange is adjacent to the top ring member, and wherein the plurality of bolts extend through the top ring member, the middle ring member, the bottom ring member and the flange to connect the crane housing to the moveable bearing ring while at the same time connecting the top ring member, the middle ring member and the bottom ring member together.

14. A vessel comprising:
   a hull provided with an opening extending vertically through the hull;
   a turret extending in the opening of the hull; and
   a slew bearing arranged between the hull and the turret allowing the turret to rotate relative to the hull about a vertical rotation axis, wherein the slew bearing comprises a stationary bearing ring fixed to the hull, and a moveable bearing ring which is fixed to the turret and which is concentric with the stationary bearing ring, the stationary bearing ring and moveable bearing ring being configured to enable rotation of the moveable bearing ring relative to the stationary bearing ring, wherein the moveable bearing ring comprises a top ring member, a bottom ring member, and a middle ring member in between the top ring member and the bottom ring member, the top, middle and bottom ring members each being formed by a plurality of ring segments, wherein vertical joints in the top, middle and bottom ring member between adjacent ring segments are not aligned to each other, wherein the top ring member, middle ring member and bottom ring member comprise a plurality of holes distributed about the circumference of the moveable ring, respectively, wherein the top ring member, middle ring member and bottom ring member are connected to each other by a plurality of bolts received in the corresponding holes of the moveable ring member, and wherein at least one hole in the middle ring member and a corresponding hole in the top ring member and/or a corresponding hole in the bottom ring member are provided with a tubular alignment member having an outer diameter equal to the corresponding holes, an inner diameter allowing to receive a bolt, and a length large enough to extend from the middle ring member to the top ring member and/or the bottom ring member respectively.

15. The vessel according to claim 14, wherein the vessel is a floating production, storage and offloading vessel.

* * * * *